United States Patent
Hall et al.

(10) Patent No.: US 9,052,910 B2
(45) Date of Patent: *Jun. 9, 2015

(54) EFFICIENCY OF SHORT LOOP INSTRUCTION FETCH

(75) Inventors: Ronald Hall, Cedar Park, TX (US);
Michael L. Karm, Cedar Park, TX (US);
Brian R. Mestan, Austin, TX (US);
David Mui, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 503 days.

This patent is subject to a terminal disclaimer.

(21) Appl. No.: 12/132,517

(22) Filed: Jun. 3, 2008

(65) Prior Publication Data

US 2009/0113192 A1   Apr. 30, 2009

Related U.S. Application Data

(63) Continuation-in-part of application No. 11/923,709, filed on Oct. 25, 2007.

(51) Int. Cl.
*G06F 9/38* (2006.01)

(52) U.S. Cl.
CPC .............. *G06F 9/381* (2013.01); *G06F 9/3814* (2013.01); *G06F 9/3851* (2013.01)

(58) Field of Classification Search
CPC ...................................................... G06F 9/381
See application file for complete search history.

(56) References Cited

U.S. PATENT DOCUMENTS

| | | | |
|---|---|---|---|
| 6,766,444 B1 * | 7/2004 | Singh et al. | 712/241 |
| 6,820,194 B1 * | 11/2004 | Bidichandani et al. | 712/245 |
| 7,571,305 B2 * | 8/2009 | Piry et al. | 712/241 |
| 2003/0163679 A1 * | 8/2003 | Ganapathy et al. | 712/241 |
| 2004/0003298 A1 * | 1/2004 | Luick | 713/300 |
| 2007/0113057 A1 * | 5/2007 | Knoth | 712/241 |
| 2007/0113059 A1 * | 5/2007 | Tran | 712/241 |
| 2008/0086621 A1 * | 4/2008 | Ogura | 712/205 |
| 2009/0113191 A1 | 4/2009 | Hall | |

OTHER PUBLICATIONS

U.S. Appl. No. 11/923,709, "Improving Processor Fetching Via Modified Instruction Buffers," Restriction Requirement dated Aug. 26, 2010.
U.S. Appl. No. 11/923,709, "Improving Processor Fetching Via Modified Instruction Buffers," Restriction Requirement dated Oct. 14, 2010.

(Continued)

*Primary Examiner* — Jacob A Petranek
(74) *Attorney, Agent, or Firm* — Yudell Isidore PLLC; Matthew Talpis

(57) ABSTRACT

A design structure provides instruction fetching within a processor instruction unit, utilizing a loop buffer, one or more virtual loop buffers, and/or an instruction buffer. During instruction fetch, modified instruction buffers coupled to an instruction cache (I-cache) temporarily store instructions from a single branch, backwards short loop. The modified instruction buffers may be a loop buffer, one or more virtual loop buffers, and/or an instruction buffer. Instructions are stored in the modified instruction buffers for the length of the loop cycle. The instruction fetch within the instruction unit of a processor retrieves the instructions for the short loop from the modified buffers during the loop cycle, rather than from the instruction cache.

21 Claims, 9 Drawing Sheets

(56) References Cited

OTHER PUBLICATIONS

U.S. Appl. No. 11/923,709, "Improving Processor Fetching Via Modified Instruction Buffers," Non-Final Office Action dated Jan. 28, 2011.

U.S. Appl. No. 11/923,709, "Improving Processor Fetching Via Modified Instruction Buffers," Final Office Action dated Jun. 24, 2011.

U.S. Appl. No. 11/923,709 entitled "Improving Fetching Efficiency of a Processor by Buffering Instructions of a Single Branch, Backwards Short Loop Within a Virtual Loop Buffer", Advisory Action dated Apr. 4, 2014.

U.S. Appl. No. 11/923,709 entitled "Improving Fetching Efficiency of a Processor by Buffering Instructions of a Single Branch, Backwards Short Loop Within a Virtual Loop Buffer", Advisory Action dated May 7, 2014.

U.S. Appl. No. 11/923,709 entitled "Improving Fetching Efficiency of a Processor by Buffering Instructions of a Single Branch, Backwards Short Loop Within a Virtual Loop Buffer", Final office action dated Jan. 21, 2014.

U.S. Appl. No. 11/923,709 entitled "Improving Fetching Efficiency of a Processor by Buffering Instructions of a Single Branch, Backwards Short Loop Within a Virtual Loop Buffer", final office action dated Aug. 29, 2013.

* cited by examiner

EFFICIENCY OF SHORT LOOP INSTRUCTION FETCH

PRIORITY CLAIM

The present application is a continuation-in-part of U.S. patent application Ser. No. 11/923,709, titled "Apparatus and Method for Improving Efficiency of Short Loop Instruction Fetch," filed on Oct. 25, 2007. Benefit of priority is hereby claimed under 35 U.S.C. §120 to U.S. patent application Ser. No. 11/923,709, which is incorporated by reference herein in its entirety and for all purposes.

BACKGROUND

1. Technical Field

The present invention generally relates to a design structure for microprocessors and in particular to a design structure for enhancing operations within a microprocessor.

2. Description of the Related Art

A microprocessor is a digital device that executes instructions specified by a computer program. A typical computer system includes a microprocessor coupled to a system memory that stores program instructions and data to be processed by the program instructions. One of the primary steps in executing instructions in a microprocessor involves fetching instructions from a cache. The majority of microprocessors possess caches which store instructions and allow rapid fetching of those instructions without having to access the main memory. As microprocessors become smaller and faster there is a need to improve the efficiency of the instruction fetch.

Several problems exist with the current method of instruction fetch from the instruction cache of a microprocessor. As an example, backward taken branch loops such as "for" loops and "while" loops, are common short loop constructs that frequent the instruction cache (I-cache). The for loop allows code to be executed repeatedly, often executing for a definite number of loop counts. While loops, also executing repeatedly, are conditional and based on the outcome of a sequential instruction. For each of the backward taken branch loop commands and the corresponding repeats, the I-cache is accessed repeatedly, even though the entire loop resides in the instruction buffer (IBUF).

Frequently accessing the I-cache with for and while loops, also known as short loops, increases device power consumption. As devices become smaller and more portable, lower power consumption is an important factor in microprocessor design. Repeated utilization of the I-cache for short loops increases energy consumption.

Repeated access to the I-cache for short loops may also cause instruction delays. For example, during an instruction fetch, delays may occur if the instruction cache is busy. Also the fetch logic must arbitrate to access the I-cache, whether there is one or multiple threads. In all these cases, increased latency can significantly degrade the efficiency of the multiprocessor.

SUMMARY OF ILLUSTRATIVE EMBODIMENTS

Disclosed is a design structure for instruction fetching within a processor instruction unit, utilizing a loop buffer, one or more virtual loop buffers, and/or an instruction buffer. During instruction fetch, modified instruction buffers coupled to an instruction cache (I-cache) temporarily store instructions from a single branch, backwards short loop. The modified instruction buffers may be a loop buffer, one or more virtual loop buffers, and/or an instruction buffer. Instructions are stored in the modified instruction buffers for the length of the loop cycle. The instruction fetch within the instruction unit of a processor retrieves the instructions for the short loop from the modified buffers during the loop cycle, rather than from the instruction cache. Retrieving the instructions from the modified instruction buffers (a) reduces power usage (or energy consumption) by eliminating repeat accesses to the I-cache and (b) increases processor performance by freeing the I-cache for processing new instructions.

In one embodiment, a loop buffer is coupled to instruction buffers to store and retrieve instructions from a single branch, backwards short loop. The process may be performed in single thread mode or simultaneous multi-thread mode (SMT). The instruction loop is detected and analyzed to calculate the number of loops the instructions will cycle. After the instructions are loaded into the instruction buffer, the instruction fetch cycles through the loop buffer instead of the I-cache to obtain the instructions. When the cycle for the single branch, backwards short loop is complete the instruction fetch returns to processing data from the I-cache.

In one embodiment, the invention utilizes virtual loop buffers (VLB) to store instructions from a single branch, backwards short loop in single thread mode. Virtual loop buffers are added to instruction buffers coupled to an I-cache. When a single branch, backwards short loop is detected, instruction lengths less than or equal to the capacity of the VLB(s) are loaded into the instruction buffers. Once loaded into the instruction buffers, the instructions are distributed to the VLB(s). Instructions are fetched from the VLB(s) until all cycles within the loop are complete. In single thread mode, after completing the cycle, the instruction unit returns to performing the instruction fetch from the I-cache until another single branch, backwards short loop is detected.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
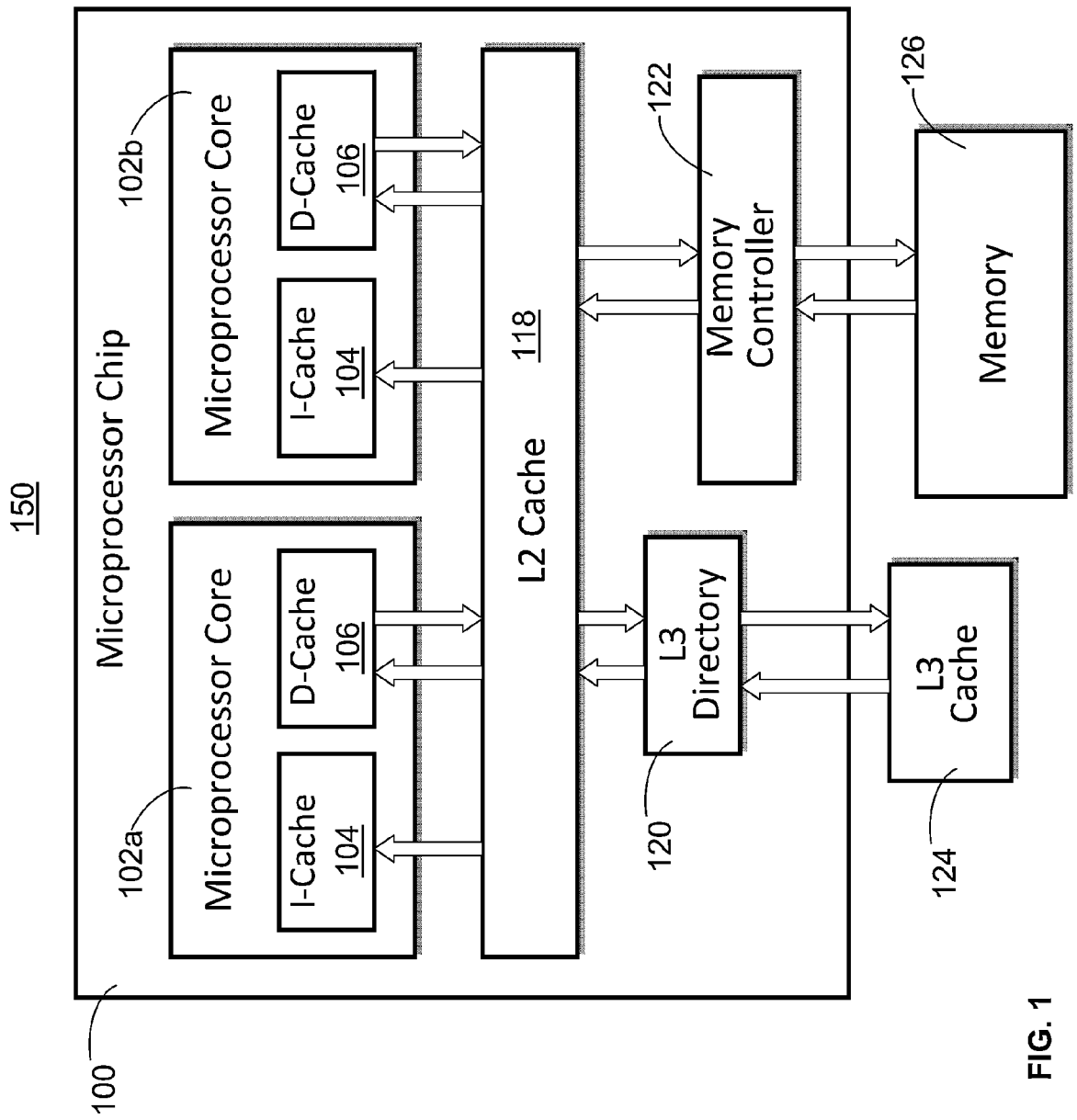
FIG. 1 is a block diagram of a microprocessor chip within a data processing system, according to one embodiment of the invention.

The illustrative embodiments provide a design structure for instruction fetching within a processor instruction unit, utilizing a loop buffer, one or more virtual loop buffers, and/or an instruction buffer. During instruction fetch modified instruction buffers coupled to an instruction cache (I-cache) temporarily store instructions from a single branch, backwards short loop. The modified instruction buffers may be a loop buffer, one or more virtual loop buffers, and/or an instruction buffer. Instructions are stored in the modified instruction buffers for the length of the loop cycle. The instruction fetch within the instruction unit of a processor retrieves the instructions for the short loop from the modified buffers during the loop cycle, rather than from the instruction cache.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to the figures, FIG. 1 depicts a block diagram representation of a microprocessor chip within a data processing system 150. Microprocessor chip 100 comprises microprocessor cores 102*a*, 102*b*. Microprocessor cores 102*a*, 102*b* utilize instruction cache (I-cache) 104 and data cache (D-cache) 106 as a buffer memory between external memory and microprocessor cores 102*a*, 102*b*. I-cache 104 and D-cache 106 are level 1 (L1) caches, which are coupled to share level 2 (L2) cache 118. L2 cache 118 operates as a memory cache, external to microprocessor cores 102*a*, 102*b*. L2 cache 118 is coupled to memory controller 122. Memory controller 122 is configured to manage the transfer of data between L2 cache 118 and main memory 126. Microprocessor chip 100 may also include level 3 (L3) directory 120. L3 directory 120 provides on chip access to off chip L3 cache 124. L3 cache 124 may be additional dynamic random access memory.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention.

Figure 2:
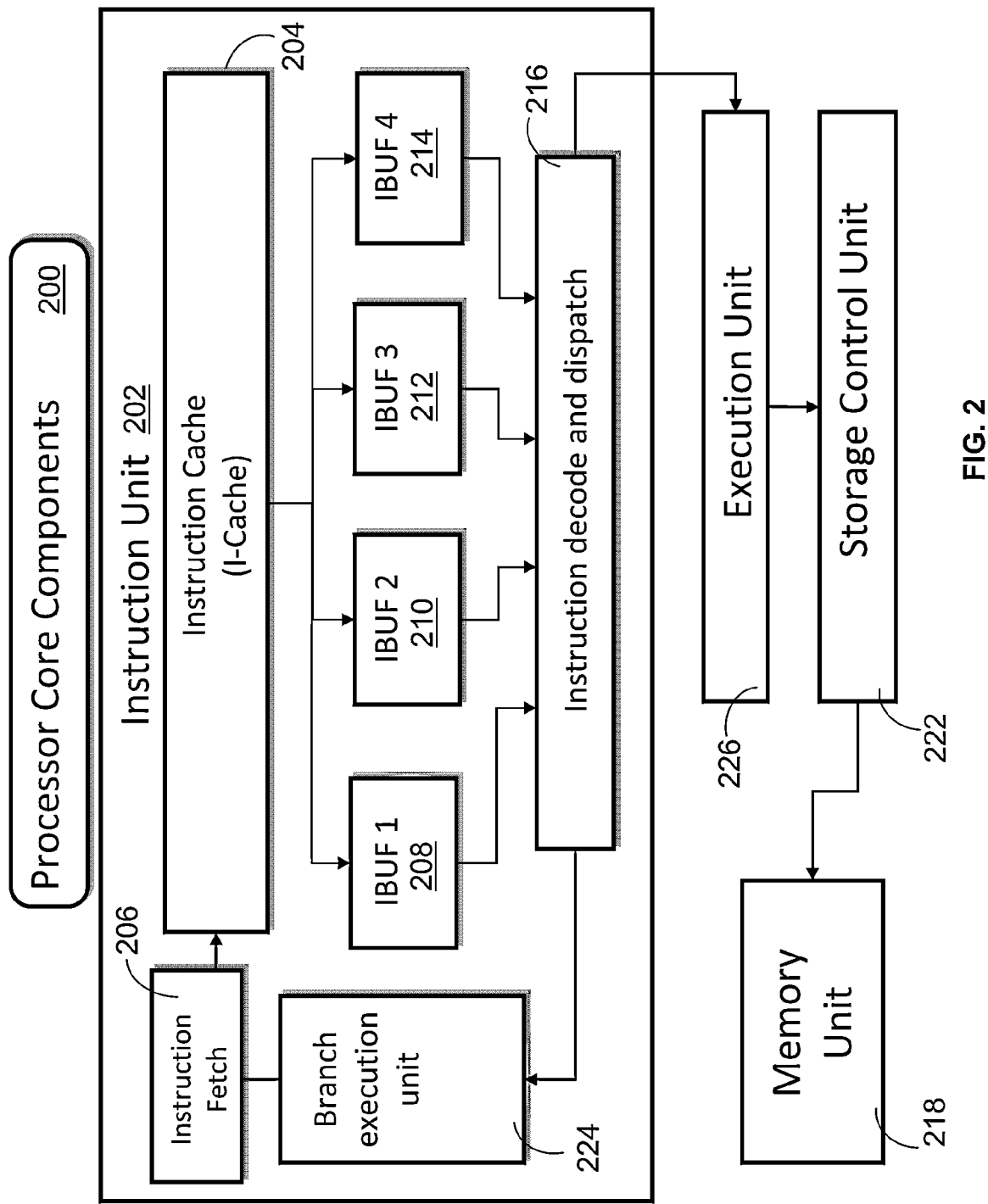
FIG. 2 is a block diagram of microprocessor components in accordance with one embodiment of the invention.

With reference now to FIG. 2, there are illustrated the major functional components of microprocessor chip 100 utilized in instruction fetching. In the described embodiments, microprocessor cores 102*a*, 102*b* (FIG. 1) serve as the primary processing units in microprocessor chip 100.

Instruction fetching is controlled by instruction unit 202. Instruction unit 202 comprises branch execution unit (BEU) 224 which utilizes instruction fetch 206 to initially obtain instructions from I-cache 204. I-cache 204 resides in the instruction unit 202 of processor core 200. The fetched instructions are placed in IBUF 1 208, IBUF 2 210, IBUF 3 212, or IBUF 4 214. Instructions from I-cache 204 are temporarily saved in IBUF 1 208, IBUF 2 210, IBUF 3 212, and IBUF 4 214 before being decoded at instruction decode and dispatch (IDD) 216. Instructions are retrieved from IDD 216 and read by registers in execution unit 226. Processed instructions are transmitted to storage control unit 222 and then to memory unit 218. In conventional processing, when utilizing IBUF 1 208, IBUF 2 210, IBUF 3 212, or IBUF 4 214 during a loop cycle, instructions are repeatedly fetched from I-cache 204.

Instruction unit 202 may be utilized in simultaneous multi-thread (SMT) mode or single thread mode. A thread is a single sequential flow of control within an instruction set, or program. Programs may have multiple threads and thereby multiple sequential flows of control. When multiple threads are utilized, multiple processes can take place within one cycle. In single thread mode, programs have a single sequential flow of control. However, a single thread is capable of working on a second task when idled by a previous task.

In one embodiment instruction fetch 206 may simultaneously cycle multiple threads or a single thread through I-cache 204. During instruction cycling, a backwards short loop is detected with no further instruction branches within the loop. Detection may be done by utilizing a branch target address cache to identify the single branch, backwards short loop. To bypass repeat fetching of instructions from I-cache 204 during SMT mode or single thread mode cycling, an additional buffer is added to the instruction buffers within instruction unit 202.

Figure 3:
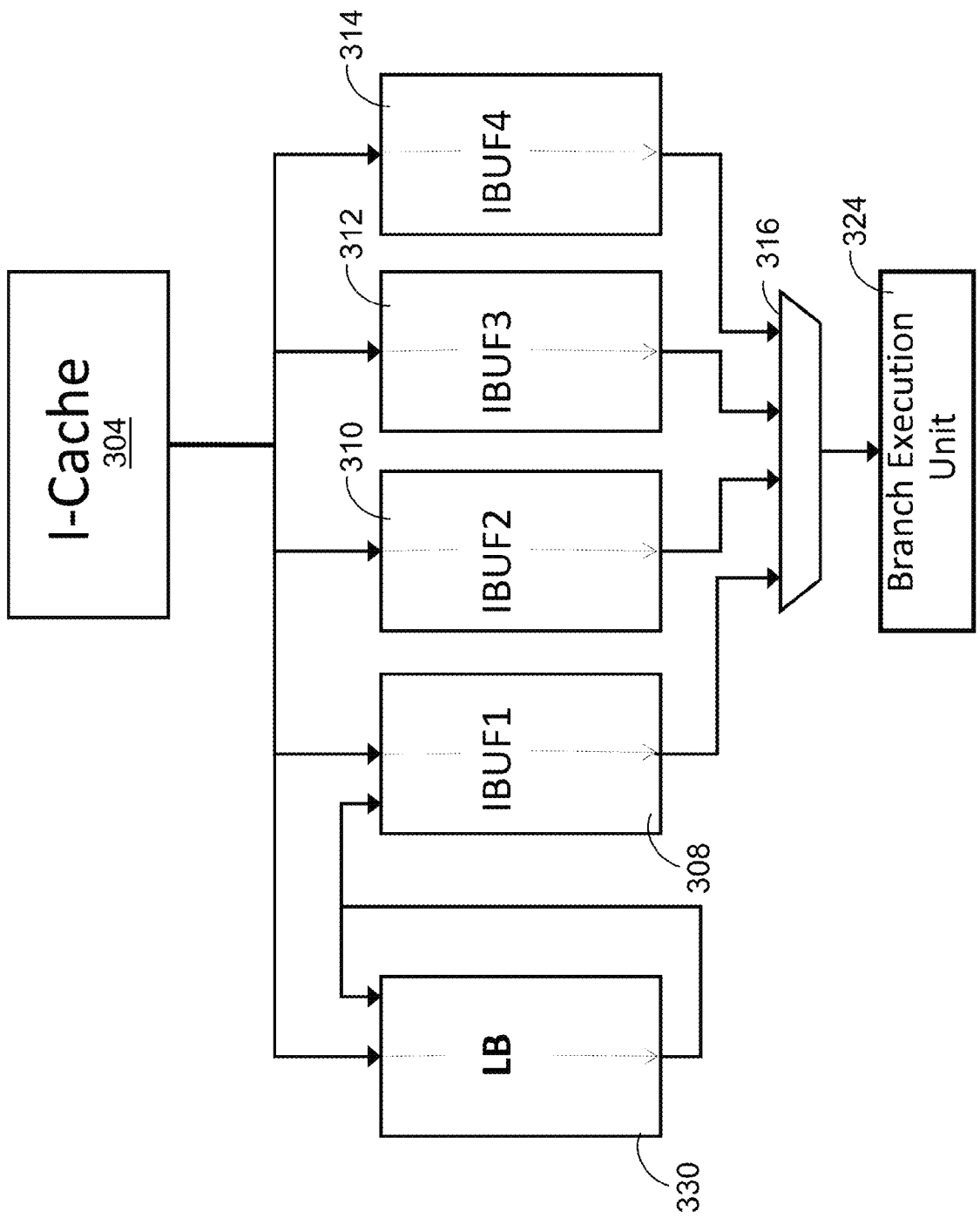
FIG. 3 is a diagram depicting instruction buffer enhancement with a loop buffer according to one embodiment of the invention.

FIG. 3 illustrates an example I-cache 304, with loop buffer 330, as well as instruction buffers IBUF 1 308, IBUF 2 310, IBUF 3 312, and IBUF 4 314. IDD 316 and branch execution unit 324 assist in processing the instructions after the instructions exit from the IBUFs. In one embodiment, loop buffer 330 is added to process single branch, backwards short loop instructions in single thread or SMT mode. A single branch, backwards short loop enters I-cache 304. Loop buffer (LB) 330 temporarily stores the backwards short loop during instruction cycling. Then, instead of repeat access to I-cache 304, loop buffer 330 is accessed until the loop cycle is complete. Accessing loop buffer 330 for the loop cycle enables I-cache 304 to be available to process new instruction threads. Upon completion of the loop cycle, processing continues to IDD 316 and/or resumes instruction fetch from I-cache 304.

In one embodiment, the length of the single branch, backwards short loop instructions cycling from I-cache 304 is greater than the capacity of loop buffer 330. When the length of the instructions exceed the length of LB 330, then IBUF 1 308, IBUF 2 310, IBUF 3 312, and/or IBUF 4 314 are utilized to assist in storing the loop instructions. Upon completion of the loop, instruction fetch 206 in FIG. 2 resumes processing instructions from I-cache 304.

In one embodiment, during single thread mode, a backwards short loop containing no further branches within the loop is detected. As provided by FIG. 4, two virtual loop buffers (VLB) 420 are added to instruction buffers IBUF 1 408, IBUF 2 410, IBUF 3 412, and IBUF 4 414. The backwards short loop instructions are distributed across VLB 430 from IBUF 1 408, IBUF 2 410, IBUF 3 412, and IBUF 4 414. The number of instruction buffers utilized during the cycle is contingent on the number of instructions within the loop. IDD 416 and branch execution unit 424 assist in processing the instructions after the instructions exit from the IBUFs. The single branch backwards short loop cycles through I-cache 404 and into IBUF 1 408, IBUF 2 410, IBUF 3 412, and IBUF 4 414. In the illustrative embodiments, the virtual loops may hold thirty-two lines of instructions (four instructions per line, with each of four buffers comprising two virtual loop buffers). The length of the backwards short loop may not exceed the capacity of VLBs 430. VLB 430 is repeatedly accessed for the length of the loop cycles. While the loop cycle is ongoing, I-cache 404 may be turned off or may be made accessible to new instructions.

Figure 5:
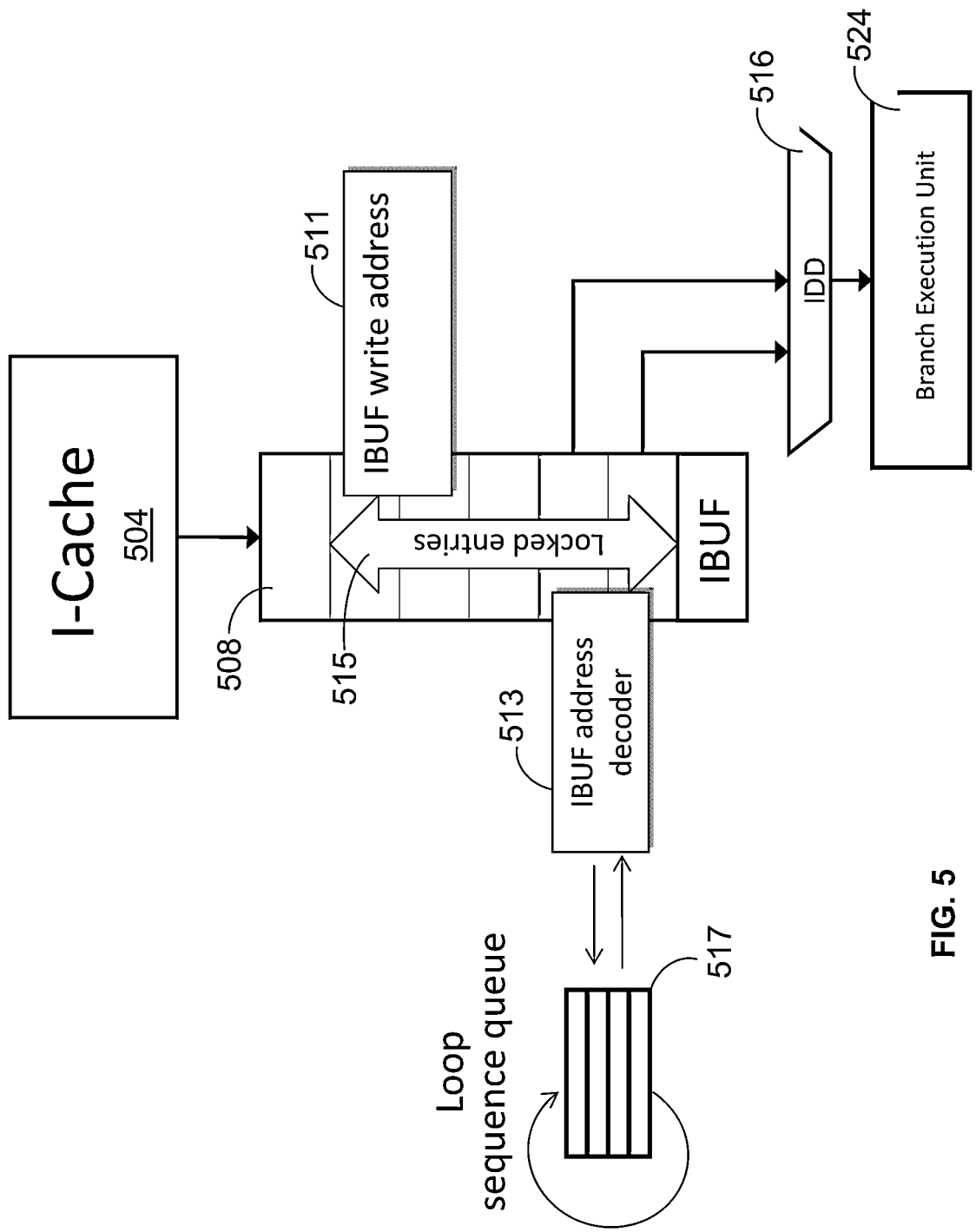
FIG. 5 is a diagram depicting instruction buffer enhancement utilizing a loop sequence queue according to one embodiment of the invention.

FIG. 5 illustrates one embodiment in which I-cache 504 couples to a single instruction buffer and register file (IBUF) 508. IDD 516 and branch execution unit 524 assist in processing the instructions after the instructions exit from IBUF 508. Instruction addresses are written to register file IBUF 508 at IBUF write 511, the address entries are locked in to IBUF 508 with locked entry 515. The instructions may be decoded (via IBUF address decoder 513) and sent to loop sequence queue 517. During single thread mode, a backwards short loop containing no further branches within the loop is detected. Register file IBUF 508 is loaded with instructions from the loop, and loop sequence queue 517 captures the address and sequence of the loop instructions. IDD 516 selects instructions from register file IBUF 508 as indexed by loop sequence 517. Loop sequence queue 517 continues rotating until the last instruction within the loop has been encountered.

Figure 6:
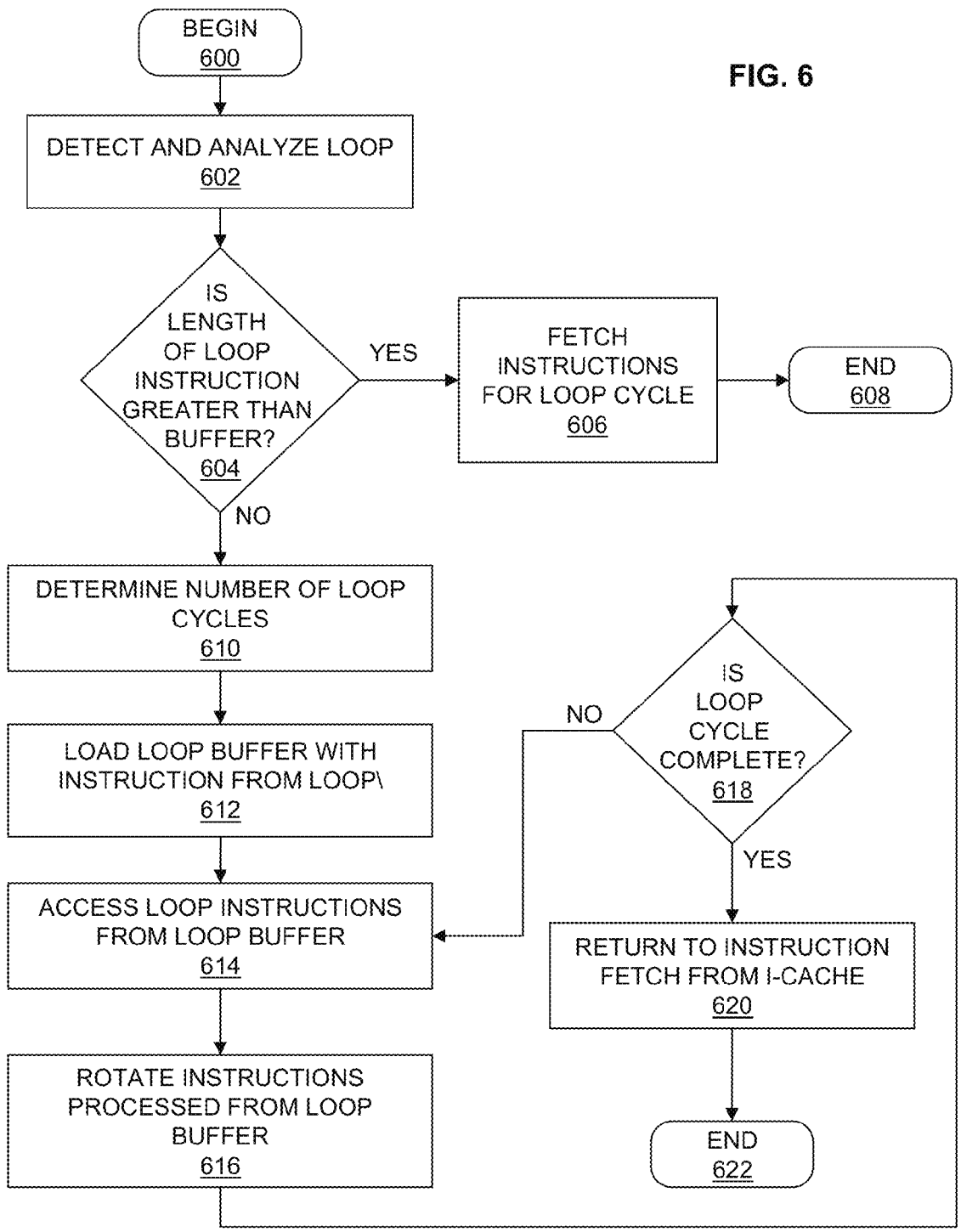
FIG. 6 is a logic flow chart of the process of short loop instruction buffer enhancement utilizing a loop buffer in accordance with one embodiment of the invention.
Figure 7:
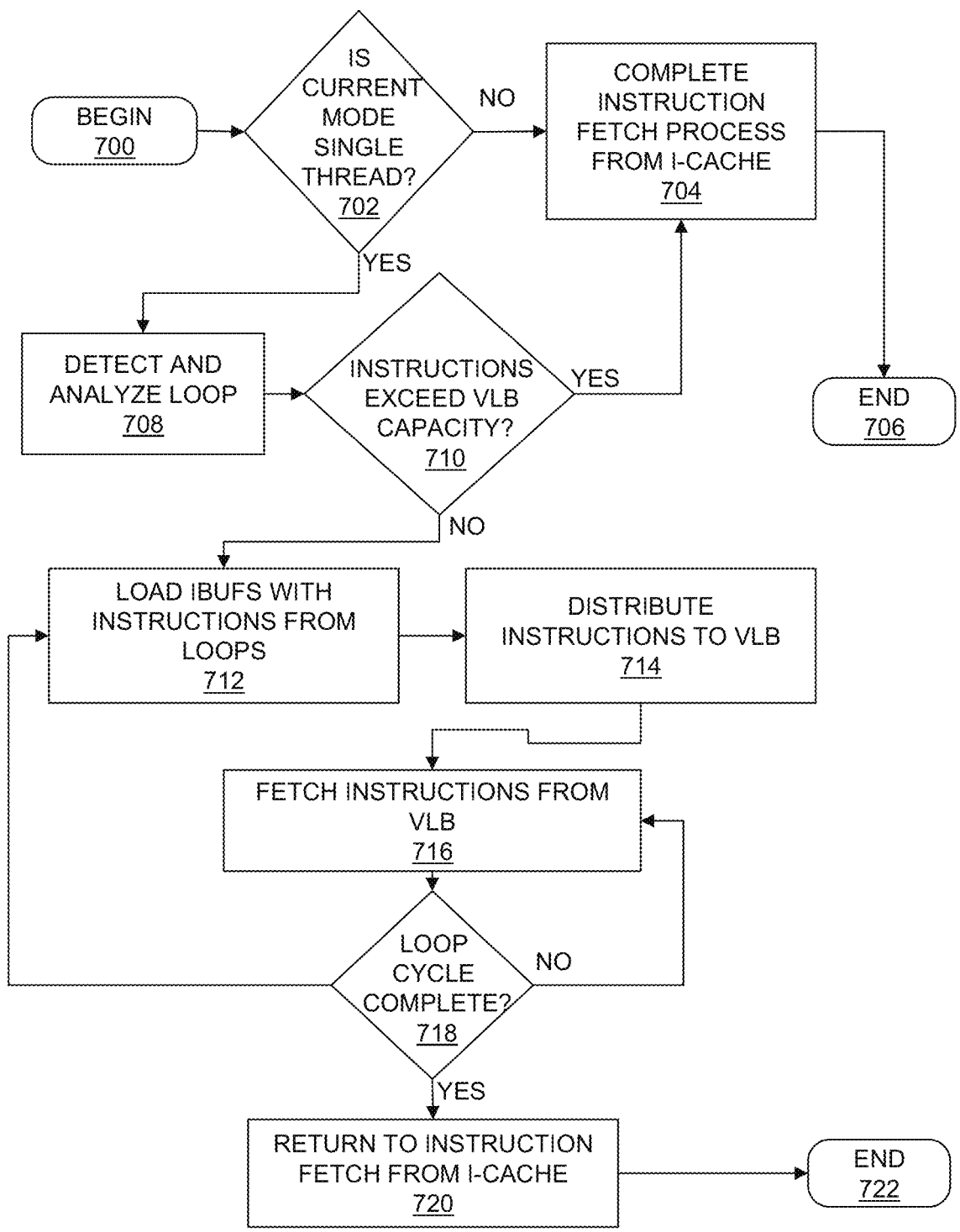
FIG. 7 is a logic flow chart of the process of short loop instruction buffer enhancement utilizing virtual loop buffers according to one embodiment of the invention.
Figure 8:
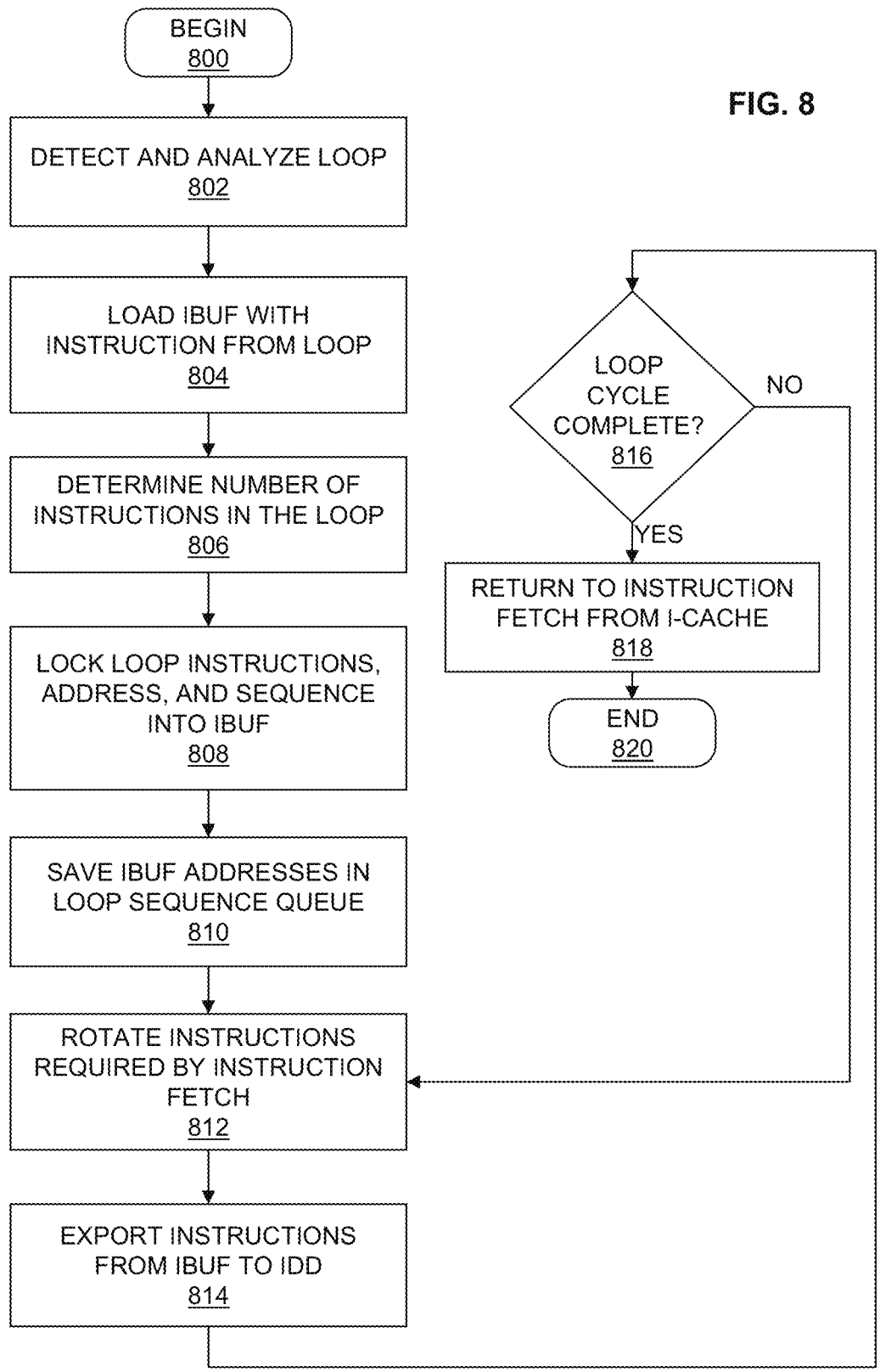
FIG. 8 is a logic flow chart of the process of short loop instruction buffer enhancement utilizing a register file instruction loop buffer in accordance with one embodiment of the invention.

FIGS. 6-8 are flow charts illustrating various methods by which the above processes of the illustrative embodiments are completed. Specifically, the method of FIG. 6 relates to the configuration provided by FIG. 3, the method of FIG. 7 relates to the configuration provided by FIG. 4, and the method of FIG. 8 relates to the configuration provided by FIG. 5. Although the methods illustrated in FIGS. 6-8 may be described with reference to components shown in respective FIGS. 3-5, it should be understood that this is merely for convenience and alternate components and/or configurations thereof can be employed when implementing the various methods.

The process of FIG. 6 begins at initiator block 600 when a single branched, backwards short loop is cycled through I-cache 304 (FIG. 3). The loop is detected and analyzed at block 602. A decision is made at block 604 whether the length of the single branch, backwards short loop instruction is greater than the capacity of loop buffer 330 (FIG. 3). If the number of instructions is greater than the loop buffer capacity, then the instruction fetch proceeds to fetch instructions for the loop cycle utilizing I-cache 304, as shown at block 606. Then, the process ends for this embodiment at block 608. If the number of instructions (or the instruction length) is not greater than the capacity of LB 330, then the process proceeds to block 610.

At block 610 the number of loop cycles is determined. The single branch, backward short loop is then loaded into LB 330 at block 612. After LB 330 is loaded with the instructions for the loop, the logic/utility proceeds to access LB 330 instead of the I-cache 304 for the loop instructions, at block 614. At block 616, the IDD rotates instructions processed from LB 330 back to LB 330. A decision is made at block 618 whether the end of the loop cycle has been reached. If all cycles of the loop have not been completed, the process returns to block 614 to fetch the instructions from LB 330. When the loop cycles are complete, the fetch instructions logic/utility returns to fetching instructions from I-cache 304, freeing LB 320 for the next single branch, backwards short loop sequence. The process ends at block 622.

Figure 4:
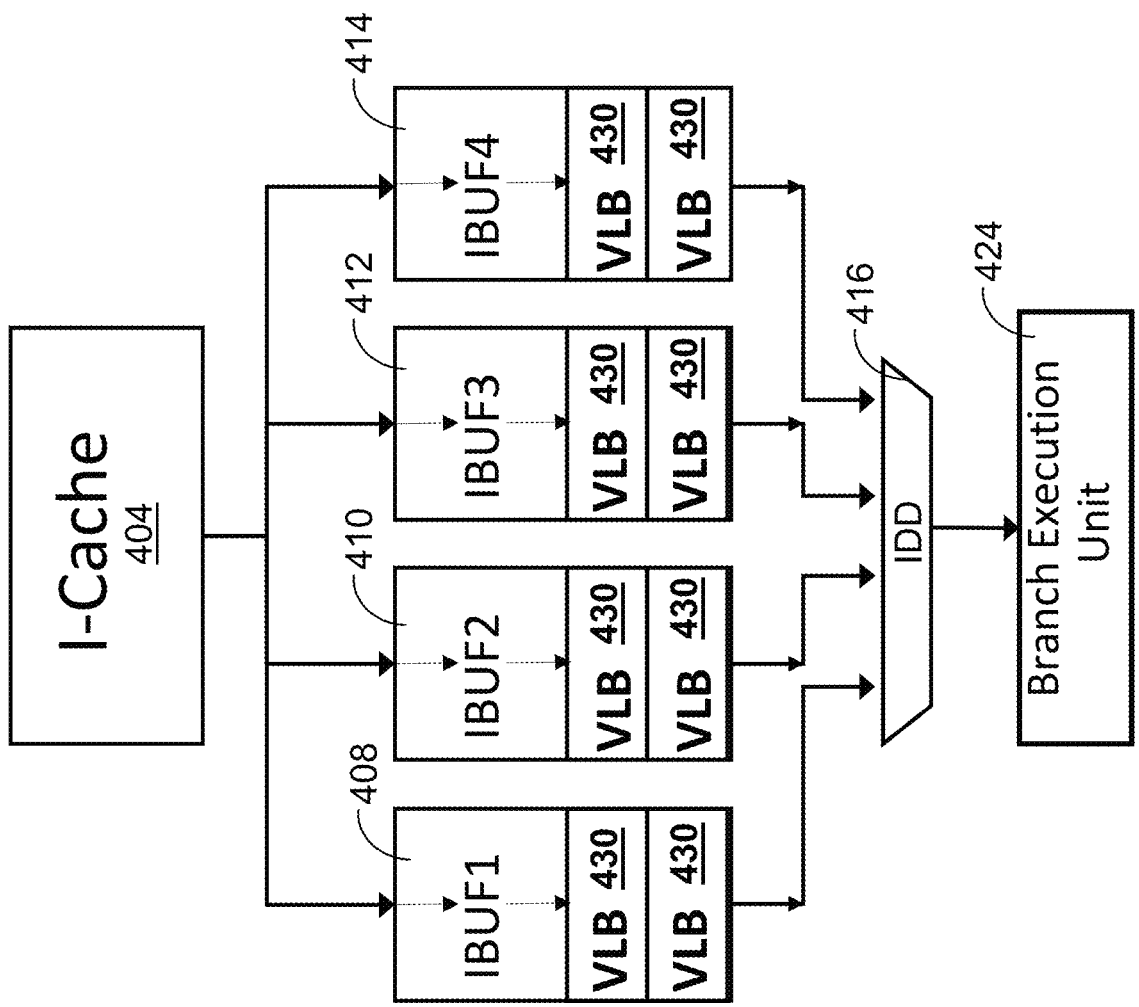
FIG. 4 is a diagram depicting instruction buffer enhancement with virtual loop buffers in accordance with one embodiment of the invention.

The FIG. 7 flow chart begins with block 700, where virtual loop buffers, such as VLB 430 (FIG. 4) are utilized to reduce the amount of instructions fetched from I-cache 404 (FIG. 4). At block 702 a decision is made, whether the current mode of instruction cycling is single thread. If the mode is not single thread, the instruction fetch process completes instruction fetch from I-cache 404, as shown at block 704, and the process ends at block 706.

If the mode is single thread the process continues to block 708 where the single branch, backwards short loop is detected and analyzed. At block 710 a decision is made whether the loop instruction length exceeds the capacity of VLB 430. If the instructions exceed the capacity of VLB 430 the process proceeds to block 704, which indicates that the instruction fetch is completed from I-cache 404. If the instructions are less than or equal to the capacity of VLB 430, then the IBUFs are loaded with the instructions at block 712.

At block 714, after the IBUFs are loaded with the instructions, the instructions are distributed to VLB 430 in each IBUF. The instructions are fetched by IDD from VLB 430 at block 716. A decision is made at block 718 whether the end of the loop cycle has been reached. If the loop cycles are not complete, the process returns to block 716, which shows that the instructions are fetched from VLB 420. When the loop cycles are complete, the instruction fetch process returns to completing instruction fetch from I-cache 404, as shown at block 720. The process ends at block 722.

The process of FIG. 8 begins at initiator block 800 after a single branched, backwards short loop is cycled through I-cache 504 (FIG. 5). The loop is detected and analyzed at block 802. At block 804, the single branch, backward short loop instructions is loaded into IBUF 508. The process continues to block 806 at which the number of instructions within the loop is determined. At step 808, the loop instructions, address, and sequence are locked into IBUF 508. The instruction addresses are saved in loop sequence queue 517, at step 810. At step 812, loop sequence queue 517 rotates the loop instructions as required by the instruction fetch. Instructions are exported to IDD 516, at step 814. A decision is made at step 816, whether the end of the loop cycle has been reached. If instructions remain in the loop cycle, the process returns to block 812, where the loop sequence queue 517 continues to rotate the instructions. If the end of the cycle has been reached, the cycle returns to instruction fetch from I-cache 504, at step 818. The process ends at step 820.

Figure 9:
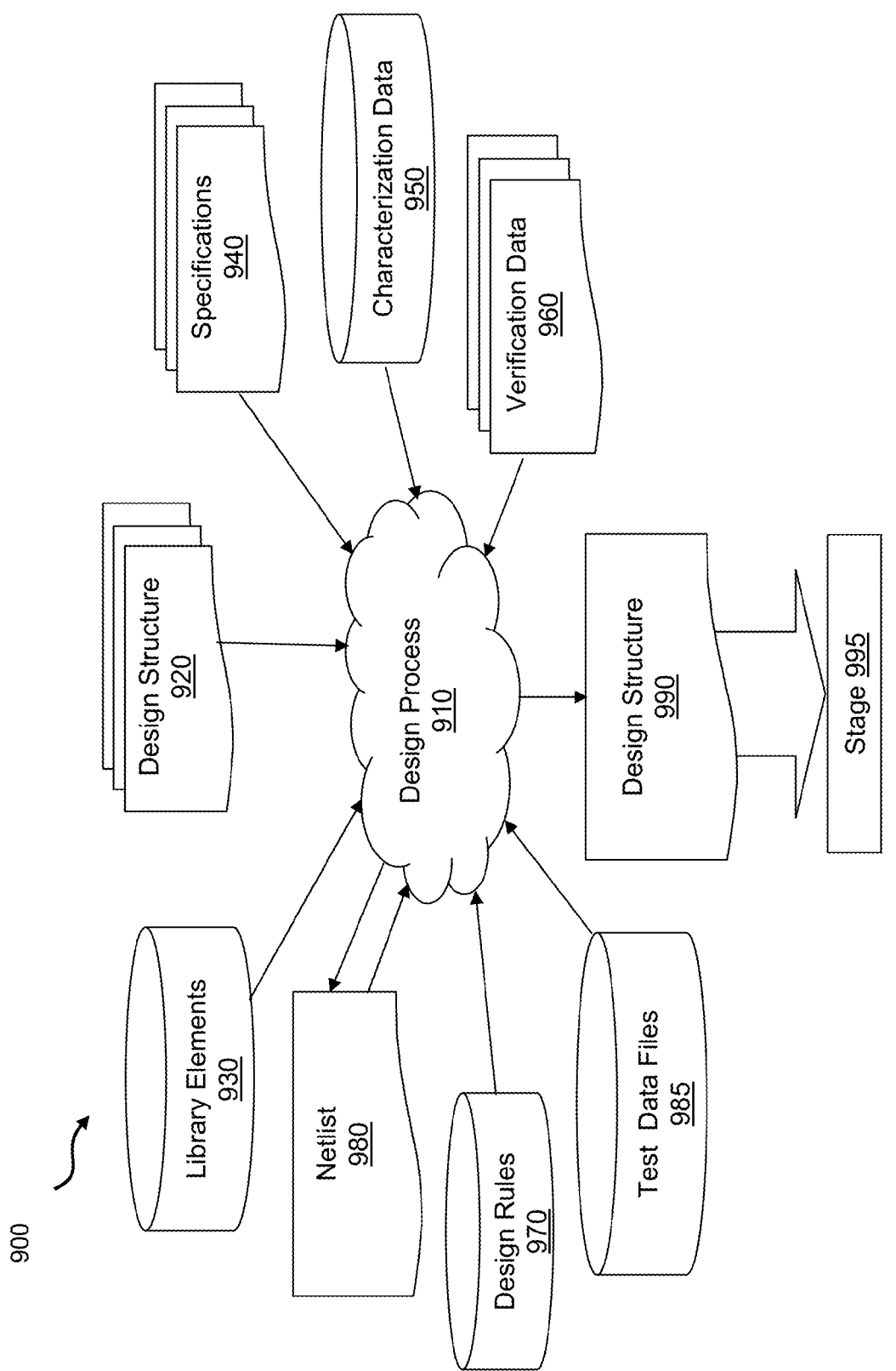
FIG. 9 is a flow diagram of a design process used in semiconductor design, manufacture, and/or test, in accordance with one embodiment of the invention.

FIG. 9 shows a block diagram of an exemplary design flow 900 used for example, in semiconductor IC logic design, simulation, test, layout, and manufacture. Design flow 900 includes processes and mechanisms for processing design structures to generate logically or otherwise functionally equivalent representations of the embodiments of the integrated circuit shown in FIGS. 1-5. The design structures processed and/or generated by design flow 900 may be encoded on machine-readable transmission or storage media to include data and/or instructions that when executed or otherwise processed on a data processing system generate a logically, structurally, or otherwise functionally equivalent representation of hardware components, circuits, devices, or systems.

FIG. 9 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission or storage medium, design structure 920 may be accessed and processed by one or more hardware and/or software modules within design process 910 to simulate or otherwise functionally represent an electronic component, circuit, electronic or logic module, apparatus, device, or system such as those shown in FIGS. 1-5. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIGS. 1-5 to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium. The medium may be a non-volatile storage medium such as a magnetic or optical disk drive, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include modules for performing standard circuit design processes such as timing analysis, verification, design rule checking, place and route operations, etc.

Design process 910 employs and incorporates well-known logic and physical design tools such as HDL compilers and simulation model build tools to process design structure 920 together with some or all of the depicted supporting data structures to generate a second design structure 990. Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-5. In one embodiment, design structure 990 may comprise a compiled, executable HDL simulation model that functionally simulates the devices shown in FIGS. 1-5.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data processed by semiconductor manufacturing tools to fabricate embodiments of the invention as shown in FIGS. 1-5. Design structure 990 may then proceed to a stage 995 where, for example, design structure 990: proceeds to tape-out, is released to manufacturing, is released to a mask house, is sent to another design house, is sent back to the customer, etc.

In the flow charts above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Generally, retrieving the instructions from the modified instruction buffers (a) reduces power usage (or energy consumption) by eliminating repeat accesses to the I-cache and (b) increases processor performance by freeing the I-cache for processing new instructions.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analog communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A design structure embodied in a non-transitory machine readable storage medium for designing, manufacturing, or testing a processor chip, the design structure comprising:
   one or more execution units;
   an instruction cache having instructions stored therein for execution by an execution unit;
   an instruction unit coupled to the one or more execution units and which provides instructions fetched from the instruction cache to the one or more execution units for execution, wherein the instructions fetched from the instruction cache are stored in a plurality of instruction buffers;
   processing logic associated with the instruction unit and which performs the functions of:
      detecting a presence of a single branch, backwards short loop within a stream of fetched instructions cycling through the instruction cache;
      adding a local loop buffer, wherein the local loop buffer is an additional buffer separate from the instruction cache that provides temporary storage for backwards short loops during instruction cycling;
      detecting when instructions in the local loop buffer for the single branch, backwards short loop are being processed in a single-threaded mode;
      in response to instructions in the local loop buffer being processed in single threaded mode, powering off the instruction cache during the processing of the instructions until the short loop cycle ends;
      determining whether one or more instructions of the single branch, backwards short loop is greater than the capacity of the local loop buffer; and
      in response to determining the length of the single branch, backwards short loop is greater than the capacity of the local loop buffer:
         utilizing the plurality of instruction buffers to assist the local loop buffer in storing one or more instructions of the single branch, backwards short loop, wherein the plurality of instruction buffers are separate from the local loop buffer and the instruction cache;
         adding one or more virtual loop buffers within each of the plurality of instruction buffers, wherein the one or more virtual loop buffers are dynamically allocated from a plurality of registers within the plurality of instruction buffers;
         loading one or more instructions of the single branch, backwards short loop into the plurality of instruction buffers, wherein the loaded one or more instructions have lengths equal to or less than the capacity of the one or more virtual loop buffers;
         distributing the single branch, backwards short loop across the one or more virtual loop buffers based on the number of instructions within the single branch, backwards short loop; and
         fetching the loaded one or more instructions from the one or more virtual loop buffers until all cycles of the single branch, backwards short loop are complete.

2. The design structure of claim 1, wherein:
   the instruction unit comprises:
      an instruction fetch unit for fetching instructions from the instruction cache;
      an instruction decode and dispatch unit that forwards instructions from the local loop buffer and the plurality of instruction buffers to the one or more execution units; and
   the processing logic further comprises logic that performs the function of determining whether the single branch, backwards short loop does contains any other branches.

3. The design structure of claim 1, wherein the local loop buffer is a-coupled to the instruction cache and to the plurality of instruction buffers, the processing logic further comprising a counter logic that performs the functions of:
   recording and tracking a number of execution loops required for the single branch, backwards short loop, wherein instructions are retrieved from the local loop buffer during the single branch, backwards short loop until the counter logic indicates that all cycles of the single branch, backwards short loop have completed; and
   in response to all cycles of the single branch, backwards short loop being completed, freeing the local loop buffer for a next single branch, backwards short loop.

4. The design structure of claim 1, wherein the local loop buffer is a register file instruction buffer, the processing logic further comprising logic that performs the functions of:
   loading the register file instruction buffer with instructions from the single branch, backwards short loop;

writing one or more instruction addresses of the one or more instructions from the single branch, backwards short loop;

locking the one or more the instruction addresses within one or more locked entries of the register file instruction buffer;

in response to detecting the end of a loop cycle, unlocking and clearing the one or more locked entries; and resuming instruction fetch from the instruction cache.

5. The design structure of claim 4, wherein the register file is coupled to a loop sequence, the processing logic further comprising logic that performs the functions of:

saving the one or more instruction addresses in the loop sequence queue;

rotating the one or more instruction addresses within the loop sequence queue as the instructions are cycled through an execution sequence; and exporting the one or more instruction addresses from the loop sequence queue when the end of the loop cycle is detected.

6. The design structure of claim 1, wherein the processing logic further comprising logic that performs the functions of:

determining a number of cycles within the single branch, backwards short loop;

detecting a scheduled execution of a sequence of instructions that constitutes the single branch, backwards short loop, wherein the logic includes a branch target address cache that is utilized to identify the single branch, backwards short loop;

automatically storing the instructions of the single branch, backwards short loop within one of a loop buffer, the one or more virtual loop buffers, and a register file instruction buffer established as the local loop buffer; and during subsequent instruction processing for the determined number of cycles within the short loop subsequently fetching the instructions of the single branch, backwards short loop from the one of the loop buffer, the one or more virtual loop buffers, and the register file instruction buffer.

7. The design structure of claim 1, wherein the processing logic that performs the detecting further comprises logic that performs the functions of:

in response to a number of cycles within the loop being complete, fetching instructions from the local loop buffer;

detecting the end of the number of cycles;

in response to the number of cycles completing, removing short loop instructions from the local loop buffer; and in response to detecting at least one of the end of the number of cycles and the local loop buffer does not contain the loop instructions, resuming instruction fetching from the instruction cache.

8. The design structure of claim 1, the processing logic further comprising logic that performs the functions of:

enabling simultaneous access to the instruction cache to fetch instructions from other sequential threads when processing instructions from the loop buffer of a first thread in simultaneous multi-threaded mode.

9. The design structure of claim 1, wherein the processing logic further comprising logic that performs the functions of:

during an instruction cycling, buffering the single branch, backwards short loop in the local loop buffer of the instruction unit; and retrieving instructions for completing the single branch, backwards short loop from the local loop buffer rather than fetching the instructions from the instruction cache;

wherein the design structure comprises a netlist, and wherein the design structure resides on a storage device in a data format used for the exchange of layout data of integrated circuits.

10. A data processing system having a memory coupled to a processor that is configured to operate according to claim 1.

11. The design structure of claim 1, wherein performing the function of adding one or more virtual loop buffers to the plurality of instruction buffers further comprises the processing logic adding two virtual loop buffers to each of the plurality of instruction buffers, wherein each virtual loop buffer is capable of storing four instructions.

12. A method in a computer aided design system for generating a functional design model of an instruction management circuit, the method comprising:

detecting a presence of a single branch, backwards short loop within a stream of fetched instructions cycling through an instruction cache of a processor, the processor having one or more execution units, the instruction cache having instructions stored therein for execution by an execution unit, and an instruction unit coupled to the one or more execution units and which provides instructions fetched from the instruction cache to the one or more execution units for execution, wherein the instructions fetched from the instruction cache are stored in a plurality of instruction buffers;

determining that the single branch, backwards short loop does not contain any other branches within the loop;

adding a local loop buffer, wherein the local loop buffer is an additional buffer separate from the instruction cache that provides temporary storage for backwards short loops during instruction cycling;

detecting when instructions in the local loop buffer for the single branch, backwards short loop are being processed in a single-threaded mode;

in response to instructions in the local loop buffer being processed in single threaded mode, powering off the instruction cache during the processing of the instructions until the short loop cycle ends;

determining whether one or more instructions of the single branch, backwards short loop is greater than the capacity of the local loop buffer; and in response to determining the length of the single branch, backwards short loop is greater than the capacity of the local loop buffer:

utilizing the plurality of instruction buffers to assist the local loop buffer in storing one or more instructions of the single branch, backwards short loop, wherein the plurality of instruction buffers are separate from the local loop buffer and the instruction cache;

adding one or more virtual loop buffers within each of the plurality of instruction buffers, wherein the one or more virtual loop buffers are dynamically allocated from a plurality of registers within the plurality of instruction buffers;

loading one or more instructions of the single branch, backwards short loop into the plurality of instruction buffers, wherein the loaded one or more instructions have lengths equal to or less than the capacity of the one or more virtual loop buffers;

distributing the single branch, backwards short loop across the one or more virtual loop buffers based on the number of instructions within the single branch, backwards short loop; and fetching the loaded one or more instructions from the one or more virtual loop buffers until all cycles of the single branch, backwards short loop are complete.

13. The method of claim 12, wherein the local loop buffer is a coupled to the instruction cache and to the plurality of instruction buffers, the method further comprising:

recording and tracking a number of execution loops required for the single branch, backwards short loop, wherein instructions are retrieved from the local loop buffer during the single branch, backwards short loop until the counter logic indicates that all cycles of the single branch, backwards short loop have completed; and in response to all cycles of the single branch, backwards short loop completing, freeing the local loop buffer for a next single branch, backwards short loop.

14. The method of claim 12, wherein the local loop buffer is a register file instruction buffer, the method further comprising:

loading the register file instruction buffer with instructions from the single branch, backwards short loop;

writing one or more instruction addresses of the one or more instructions from the single branch, backwards short loop;

locking the one or more the instruction addresses within one or more locked entries of the register file instruction buffer;

saving the one or more instruction addresses in the loop sequence queue;

rotating the one or more instruction addresses within the loop sequence queue as the instructions are cycled through an execution sequence; and in response to detecting the end of a loop cycle:

exporting the one or more instruction addresses from the loop sequence queue when the end of the loop cycle is detected;

unlocking and clearing the one or more locked entries; and resuming instruction fetch from the instruction cache.

15. The method of claim 12, wherein the instruction unit includes an instruction fetch unit for fetching instructions from the instruction cache, the plurality of instruction buffers within which fetched instructions are initially buffered prior to being sent to the one or more execution units and an instruction decode and dispatch unit that forwards instructions from the plurality of instruction buffers to the one or more execution units; the method further comprising:

determining a number of cycles within the single branch, backwards short loop;

detecting a scheduled execution of a sequence of instructions that constitutes the single branch, backwards short loop, wherein the logic includes a branch target address cache that is utilized to identify the single branch, backwards short loop;

automatically storing the instructions of the single branch, backwards short loop within one of a loop buffer, the one or more virtual loop buffers, and a register file instruction buffer established as the local loop buffer; and during subsequent instruction processing for the determined number of cycles within the short loop subsequently fetching instructions of the single branch, backwards short loop from the one of the loop buffer, the one or more virtual loop buffers, and the register file instruction buffer.

16. The method of claim 12, wherein the detecting the presence of a single branch, backwards short loop within a stream of fetched instructions cycling through an instruction cache of a processor further comprises:

in response to determining a number of cycles within the loop is not complete, fetching instructions from the local loop buffer;

detecting an end of the number of cycles;

in response to the number of cycles completing, removing short loop instructions from the local loop buffer; and in response to detecting at least one of the end of the number of cycles and the local loop buffer does not contain the loop instructions, resuming instruction fetching from the instruction cache.

17. The method of claim 12, further comprising:

enabling simultaneous access to the instruction cache to fetch instructions from other sequential threads when processing instructions from the loop buffer of a first thread in simultaneous multi-threaded mode.

18. A hardware description language (HDL) design structure encoded on a non-transitory machine-readable data storage device, the HDL design structure comprising elements that when processed in a computer-aided design system generates a machine-executable representation of an integrated circuit, wherein the HDL design structure comprises a first element processed to generate a functional computer-simulated representation of a mechanism for the functions recited by claim 9.

19. The method of claim 12, wherein the adding one or more virtual loop buffers to the plurality of instruction buffers further comprises adding two virtual loop buffers to each of the plurality of instruction buffers, wherein each virtual loop buffer is capable of storing four instructions.

20. The method of claim 12, further comprising:

during an instruction cycling, buffering the single branch, backwards short loop in the local loop buffer of the instruction unit; and retrieving instructions for completing the single branch, backwards short loop from the local loop buffer rather than fetching the instructions from the instruction cache;

wherein the adding one or more virtual loop buffers to the plurality of instruction buffers further comprises adding two virtual loop buffers to each of the plurality of instruction buffers, wherein each virtual loop buffer is capable of storing four instructions.

21. A data processing system comprising:

a processor;

a memory coupled to the processor;

one or more execution units coupled to the processor;

an instruction cache having instructions stored therein for execution by the processor;

an instruction unit coupled to the one or more execution units and which provides instructions fetched from the instruction cache to the one or more execution units for execution, the instruction unit further comprising:

an instruction fetch unit for fetching instructions from the instruction cache, wherein the instructions fetched from the instruction cache are stored in a plurality of instruction buffers; and an instruction decode and dispatch unit that forwards instructions from the local loop buffer and the plurality of instruction buffers to the one or more execution units; and processing logic associated with the instruction unit that when executed by the processor enables the processor to:

detect a presence of a single branch, backwards short loop within a stream of fetched instructions cycling through the instruction cache;

add a local loop buffer, wherein the local loop buffer is an additional buffer separate from the instruction cache that provides temporary storage for backwards short loops during instruction cycling, and wherein the local loop buffer is coupled to the instruction cache and to the plurality of instruction buffers;

in response to a number of cycles within the loop being complete, fetch instructions from the local loop buffer;

determine whether the single branch, backwards short loop contains any other branches;

during an instruction cycling, buffer the single branch, backwards short loop in the local loop buffer of the instruction unit;

retrieve instructions for completing the single branch, backwards short loop from the local loop buffer rather than fetching the instructions from the instruction cache;

detect when instructions in the local loop buffer for a single branch, backwards short loop are being processed in single threaded mode;

in response to instructions in the local loop buffer being processed in single threaded mode, power off the instruction cache during the processing of the instructions until the short loop cycle ends;

enable simultaneous access to the instruction cache to fetch instructions from other sequential threads when processing instructions from the loop buffer of a first thread in simultaneous multi-threaded mode;

determine a number of cycles within the single branch, backwards short loop;

record and track a number of execution loops required for the single branch, backwards short loop, wherein instructions are retrieved from the local loop buffer during the single branch, backwards short loop until all cycles of the single branch, backwards short loop have completed;

detect a scheduled execution of a sequence of instructions that constitutes the single branch, backwards short loop;

identify the single branch, backwards short loop from a branch target address cache;

automatically store the instructions of the single branch, backwards short loop within one of a loop buffer, a virtual loop buffer, and a register file instruction buffer established as the local loop buffer;

during subsequent instruction processing for the determined number of cycles within the short loop, subsequently fetch the instructions of the single branch, backwards short loop from the one of the loop buffer, the one or more virtual loop buffers, and the register file instruction buffer;

detect an end of the number of cycles;

in response to the number of cycles completing, remove short loop instructions from the local loop buffer;

in response to detecting at least one of the end of the number of cycles and the local loop buffer not containing the loop instructions, resume instruction fetching from the instruction cache;

in response to all cycles of the single branch, backwards short loop being completed, free the local loop buffer for a next single branch, backwards short loop;

determine whether one or more instructions of the single branch, backwards short loop is greater than the capacity of the local loop buffer;

in response to determining the length of the single branch, backwards short loop is greater than the capacity of the local loop buffer:

utilize the plurality of instruction buffers to assist the local loop buffer in storing one or more instructions of the single branch, backwards short loop, wherein the plurality of instruction buffers are separate from the local loop buffer and the instruction cache;

add two virtual loop buffers within each of the plurality of instruction buffers, wherein the two virtual loop buffers are dynamically allocated from a plurality of registers within the plurality of instruction buffers, wherein each virtual loop buffer is capable of storing four instructions;

load one or more instructions of the single branch, backwards short loop into the plurality of instruction buffers, wherein the loaded one or more instructions have lengths equal to or less than the capacity of the one or more virtual loop buffers;

distribute the single branch, backwards short loop across the two virtual loop buffers within at least one of the plurality of instruction buffers based on the number of instructions within the single branch, backwards short loop;

fetch the loaded one or more instructions from the two virtual loop buffers within at least one of the plurality of instruction buffers until all cycles of the single branch, backwards short loop are complete;

in response to the local loop buffer being a register file instruction buffer:

load the register file instruction buffer with instructions from the single branch, backwards short loop;

write one or more instruction addresses of the one or more instructions from the single branch, backwards short loop;

lock the one or more the instruction addresses within one or more locked entries of the register file instruction buffer;

in response to detecting the end of a loop cycle, unlock and clear the one or more locked entries; and resume instruction fetch from the instruction cache; and in response to the register file being coupled to a loop sequence:

save the one or more instruction addresses in the loop sequence queue;

rotate the one or more instruction addresses within the loop sequence queue as the instructions are cycled through an execution sequence; and export the one or more instruction addresses from the loop sequence queue when the end of the loop cycle is detected.

* * * * *